(12) United States Patent
Jackson

(10) Patent No.: US 7,351,278 B2
(45) Date of Patent: Apr. 1, 2008

(54) ADDITIVE FOR HIGH OPTICAL DENSITY INKJET INK

(75) Inventor: Christian Jackson, Wilmington, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 108 days.

(21) Appl. No.: 11/140,701

(22) Filed: May 31, 2005

(65) Prior Publication Data

US 2005/0274281 A1    Dec. 15, 2005

Related U.S. Application Data

(60) Provisional application No. 60/578,246, filed on Jun. 9, 2004.

(51) Int. Cl.
*C09D 11/02* (2006.01)
*B41J 2/01* (2006.01)

(52) U.S. Cl. .................. 106/31.43; 106/31.47; 106/31.75; 106/31.77; 347/100

(58) Field of Classification Search ............. 106/31.43, 106/31.75, 31.47, 31.77; 347/100
See application file for complete search history.

(56) References Cited

U.S. PATENT DOCUMENTS

| | | | |
|---|---|---|---|
| 4,361,842 A | 11/1982 | Haruta et al. |
| 5,085,698 A | 2/1992 | Ma et al. |
| 5,231,131 A | 7/1993 | Chu et al. |
| 5,554,739 A | 9/1996 | Belmont |
| 5,571,311 A | 11/1996 | Belmont et al. |
| 5,609,671 A | 3/1997 | Nagasawa |
| 5,672,198 A | 9/1997 | Belmont |
| 5,698,016 A | 12/1997 | Adams et al. |
| 5,707,432 A | 1/1998 | Adams et al. |
| 5,718,746 A | 2/1998 | Nagasawa et al. |
| 5,747,562 A | 5/1998 | Mahmud et al. |
| 5,749,950 A | 5/1998 | Mahmud et al. |
| 5,803,959 A | 9/1998 | Johnson et al. |
| 5,837,045 A | 11/1998 | Johnson et al. |
| 5,846,307 A | 12/1998 | Nagasawa et al. |
| 5,851,280 A | 12/1998 | Belmont et al. |
| 5,861,447 A | 1/1999 | Nagasawa et al. |
| 5,885,335 A | 3/1999 | Adams et al. |
| 5,895,522 A | 4/1999 | Belmont et al. |
| 5,922,118 A | 7/1999 | Johnson et al. |
| 5,928,419 A | 7/1999 | Uemura et al. |
| 5,976,233 A | 11/1999 | Osumi et al. |
| 6,057,384 A | 5/2000 | Nguyen et al. |
| 6,099,632 A | 8/2000 | Nagasawa et al. |
| 6,123,759 A | 9/2000 | Mise et al. |
| 6,153,001 A | 11/2000 | Suzuki et al. |
| 6,221,141 B1 | 4/2001 | Takada et al. |
| 6,221,142 B1 | 4/2001 | Wang et al. |
| 6,221,143 B1 | 4/2001 | Palumbo |
| 6,277,183 B1 | 8/2001 | Johnson et al. |
| 6,281,267 B2 | 8/2001 | Parazak |
| 6,329,446 B1 | 12/2001 | Sacripante et al. |
| 6,332,919 B2 | 12/2001 | Osumi et al. |
| 6,375,317 B1 | 4/2002 | Osumi et al. |
| 6,852,156 B2 | 2/2005 | Yeh et al. |
| 2001/0035110 A1 | 11/2001 | Kato |

FOREIGN PATENT DOCUMENTS

| | | |
|---|---|---|
| EP | 0 556 649 B1 | 8/1993 |
| EP | 0 823 464 A1 | 2/1998 |
| EP | 0 834 538 A1 | 4/1998 |
| EP | 1 086 997 A2 | 3/2001 |
| EP | 1 114 851 A1 | 7/2001 |
| EP | 1 122 286 A1 | 8/2001 |
| EP | 1 146 090 A2 | 10/2001 |
| EP | 1 158 030 A2 | 11/2001 |
| EP | 1 167 471 A2 | 1/2002 |
| EP | 1 403 339 A1 | 3/2004 |
| WO | WO 01/10963 A1 | 2/2001 |
| WO | WO 01/25340 A1 | 4/2001 |
| WO | WO 03/104340 A1 | 12/2003 |

OTHER PUBLICATIONS

International Search Report, Sep. 30, 2005.

*Primary Examiner*—Helene Klemanski

(57) ABSTRACT

This invention pertains to an aqueous inkjet ink with a certain chelator additive, inkjet ink sets based on this aqueous inkjet ink, and to a method of printing with these inks and ink sets, whereby optical density (OD) of a printed image is increased. The chelator additive is particularly advantageous for increasing the OD of inks with a self-dispersing pigment colorant, and particularly the combination of such colorant with a multivalent cation additive.

23 Claims, No Drawings

ADDITIVE FOR HIGH OPTICAL DENSITY INKJET INK

CROSS-REFERENCE TO RELATED APPLICATIONS

This application claims priority under 35 U.S.C. §119 from U.S. Provisional Application Ser. No. 60/578,246 (filed Jun. 9, 2004), the disclosure of which is incorporated by reference herein for all purposes as if fully set forth.

BACKGROUND OF THE INVENTION

This invention pertains to an aqueous inkjet ink with a certain additive and to a method of printing with this ink whereby optical density (OD) of a printed image is increased. The additive is particularly advantageous for increasing the OD of inks with a self-dispersing pigment colorant.

Inkjet printing is a non-impact printing process in which droplets of ink are deposited on print media, such as paper, to form the desired image. The droplets are ejected from a printhead in response to electrical signals generated by a microprocessor.

Both dyes and pigments have been used as colorants for inkjet inks. Inks comprising pigments dispersed in aqueous media are considered advantageous because printed images tend to be waterfast and lightfast.

Pigments suitable for aqueous inkjet inks are in general well-known in the art. Traditionally, pigments have been stabilized by dispersing agents, such as polymeric dispersants or surfactants, to produce a stable dispersion of the pigment in the vehicle. More recently though, so-called "self-dispersible" or "self-dispersing" pigments (hereafter "SDP") have been developed. As the name would imply, SDPs are dispersible in water without dispersants.

SDPs are often advantageous over traditional dispersant stabilized pigments from the standpoint of greater stability and lower viscosity at the same pigment loading. This can provide greater formulation latitude in final ink.

Still, there is a need for pigment inks with improved coloristic properties. Compositions and methods that provide increased optical density and chroma are desirable.

SUMMARY OF THE INVENTION

In one aspect, the present invention pertains to an inkjet ink comprising an aqueous vehicle and a chelator, wherein the chelator comprises a non-polymeric molecule having at least at least two coordinating nitrogen atoms and no carboxyl groups. The inkjet ink may be substantially colorless (preferably without colorant), or may contain a colorant that is stably dispersed or dissolved in the aqueous vehicle. If a colorant is used, it is preferably a pigment, and more preferably a self-dispersing pigment (SDP).

The chelator should be present at a level effective to increase optical density of the printed colorant over the same ink without chelator.

In a preferred embodiment, the inkjet ink further comprises a multivalent cationic metal species. The species is preferably soluble in the aqueous vehicle.

In another aspect of the present invention, there is provided an inkjet ink set comprising the above-described inkjet ink.

In one preferred embodiment, the inkjet ink set comprises a first inkjet ink and a second inkjet ink, wherein the first inkjet ink is a substantially colorless inkjet ink as set forth above and described in further detail below, and the second inkjet ink is a colored ink comprising an aqueous vehicle and pigment colorant.

In another preferred embodiment, the inkjet ink set comprises a at least three (such as CMY), and more preferably four (such as CMYK), differently colored inkjet inks comprising, individually, a colorant stably dispersed or dissolved in an aqueous vehicle, wherein at least one of the three differently colored inkjet inks is a colored inkjet ink as set forth above and described in further detail below.

The present invention also relates to a method for ink jet printing onto a substrate, comprising the steps of:

(a) providing an ink jet printer that is responsive to digital data signals;

(b) loading the printer with a substrate to be printed;

(c) loading the printer with an inkjet ink or inkjet ink set as set forth above and as described in further detail below; and (d) printing onto the substrate using the inkjet ink set in response to the digital data signals.

In one preferred embodiment, an inkjet ink set is used wherein the first inkjet ink is a substantially colorless inkjet ink as set forth above and described in further detail below, and the second inkjet ink is a colored ink comprising an aqueous vehicle and pigment colorant (preferably and SDP), and wherein the second inkjet ink is underprinted with the first inkjet ink. In this instance, the first inkjet ink preferably acts as a fixer fluid for the second inkjet ink and, optionally, other colored inkjet inks in the ink set.

The use of a fixer fluid improves the printed properties of the colored ink, especially the OD and chroma.

These and other features and advantages of the present invention will be more readily understood by those of ordinary skill in the art from a reading of the following detailed description. It is to be appreciated that certain features of the invention which are, for clarity, described above and below in the context of separate embodiments, may also be provided in combination in a single embodiment. Conversely, various features of the invention that are, for brevity, described in the context of a single embodiment, may also be provided separately or in any subcombination. In addition, references in the singular may also include the plural (for example, "a" and "an" may refer to one, or one or more) unless the context specifically states otherwise. Further, reference to values stated in ranges include each and every value within that range.

DETAILED DESCRIPTION OF THE PREFERRED EMBODIMENTS

Vehicle

"Aqueous vehicle" refers to water or a mixture of water and at least one water-soluble organic solvent (co-solvent). Selection of a suitable mixture depends on requirements of the specific application, such as desired surface tension and viscosity, the selected colorant, drying time of the ink, and the type of substrate onto which the ink will be printed. Representative examples of water-soluble organic solvents that may be selected are disclosed in U.S. Pat. No. 5,085,698 (the disclosure of which is incorporated by reference herein for all purposes as if fully set forth).

If a mixture of water and a water-soluble solvent is used, the aqueous vehicle typically will contain about 30% to about 95% water with the balance (i.e., about 70% to about 5%) being the water-soluble solvent. Preferred compositions contain about 60% to about 95% water, based on the total weight of the aqueous vehicle.

The amount of aqueous vehicle in the ink is typically in the range of about 70% to about 99.8%, and preferably about 80% to about 99.8%, based on total weight of the ink.

The aqueous vehicle can be made to be fast penetrating (rapid drying) by including surfactants or penetrating agents such as glycol ethers and 1,2-alkanediols. Glycol ethers include ethylene glycol monobutyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, and dipropylene glycol mono-isopropyl ether. 1,2-Alkanediols are preferably 1,2-C4-6 alkanediols, most preferably 1,2-hexanediol. Suitable surfactants include ethoxylated acetylene diols (e.g. Surfynols® series from Air Products), ethoxylated primary (e.g. Neodol® series from Shell) and secondary (e.g. Tergitol® series from Union Carbide) alcohols, sulfosuccinates (e.g. Aerosol® series from Cytec), organosilicones (e.g. Silwet® series from Witco) and fluoro surfactants (e.g. Zonyl® series from DuPont).

The amount of glycol ether(s) and 1,2-alkanediol(s) added must be properly determined, but is typically in the range of from about 1 to about 15% by weight and more typically about 2 to about 10% by weight, based on the total weight of the ink. Surfactants may be used, typically in the amount of about 0.01 to about 5% and preferably about 0.2 to about 2%, based on the total weight of the ink.

Chelator

A chelator as prescribed herein is a non-polymeric molecule comprising two nitrogen atoms that can act as a bidentate ligand in a coordination type complex with a single metal atom. For a chelator to act as a bidentate ligand, it is understood that (a) each of the nitrogen atoms must have a lone pair of electrons available for donation (Lewis base); and (b) the relative position and conformation of the two nitrogen atoms is such that the lone pairs of electrons can properly orient for bidentate coordination (bidentate orientation). The chelator may comprise more than two nitrogen atoms as long as at least two nitrogens satisfy the prescribed conditions.

Reference to bidentate ligands and coordination geometry can be found in standard texts such as *Advanced Inorganic Chemistry, 6th Edition;* by F. Albert Cotton et al.; John Wiley & Sons, Inc. publisher; pages 347-354 (the relevant disclosure of which is incorporated by reference herein for all purposes as if fully set forth).

For effective bidentate coordination, there are preferably from 1 to 4 atoms between the two coordinating nitrogen atoms.

If the chelator is comprised of more than two coordinating nitrogens, it may be possible for intermolecular coordination to occur between metals and thereby form an extended network (and precipitate). In one preferred embodiment, the chelator contains no more than three electron-donating nitrogens (condition (a) above). In another preferred embodiment, the chelator may contain more than three electron-donating nitrogens, but has the excess (more than three) electron-donating nitrogens hindered so as to prevent intermolecular coordination.

The chelator is preferably molecular, although a low molecular weight oligomer such as a trimer or tetramer might be useful. For clarification, a chelator in the context of the present invention would not include a polyethylene imine, a polyallyl amine, a polyvinyl pyridine and the like, wherein the chain length is more than about ten monomers.

The chelator preferably also contains no carboxyl group(s). In this context, a carboxyl group means both the protonated form (—COOH) and salt form (—COO$^-$). For clarification, a chelator in the context of this limitation would not include ethylenediaminetetracetic acid (EDTA) and salts thereof.

In another preferred embodiment, the chelator contains no ionizable groups of any sort other than the nitrogens. Other ionizable groups include, for example, sulfonic acid groups.

Preferably, the chelator is substantially colorless (not colored, or at most only slightly colored). The chelator is thus not intended to be used as an inkjet colorant.

Preferably, the chelator is soluble in the aqueous vehicle at the concentration used and is stable in solution, that is, it does not readily form a precipitate under normal conditions of storage or use.

Preferred examples of chelators include, but are not limited to, phenanthroline, 2,2-dipyridyl, 2,2-dipyridylamine and ethylene diamine, and derivatives thereof.

Multivalent Cation

The chelator is preferably employed in combination with one or more multivalent cations. The effective amounts of chelator and multivalent cation needed in a particular situation can vary, and some adjustment will generally be necessary.

"Multivalent" indicates an oxidation state of two or more and, for an element "Z", are typically described as $Z^{2+}$, $Z^{3+}$, $Z^{4+}$ and so forth. For brevity, multivalent cations may be referred to herein as $Z^x$. The multivalent cations are preferably soluble in the aqueous vehicle, and preferably exist in the aqueous vehicle in a substantially ionized state. The multivalent cations should be in a form where they are free and available to interact with ink components, in particular the SDP. A multivalent cation in unavailable form, for example $Z^x$ tightly bound as a refractory oxide, is not considered a multivalent cation for the purposes of this invention.

$Z^x$ includes, but is not limited to multivalent cations of the following elements: Mg, Ca, Sr, Ba, Sc, Y, La, Ti, Zr, V, Cr, Mn, Fe, Ru, Co, Rh, Ni, Pd, Pt, Cu, Au, Zn, Al, Ga, In, Sb, Bi, Ge, Sn, Pb. In one preferred embodiment, the multivalent cation comprises at least one of Fe, Co, Cu and Zn.

$Z^x$ can be incorporated into ink by addition in a salt form or by addition in an alkaline form and used as a base in the adjustment of the ink pH. When colorant is present, especially an ionically stabilized colorant the presence of large amounts of $Z^x$ can be destabilizing. The effective levels of $Z^x$ for the instant inks are below that which cause instability (or other problems), which amounts can readily be determined by routine experimentation.

There is no particular lower limit of $Z^x$, although minimum levels contemplated by the instant invention are levels greater than trace or incidental amounts. Generally, there is at least about 2 ppm, commonly at least about 4 ppm, and even about 10 ppm or more of multivalent in the ink. Likewise, there is no particular upper limit except as dictated by stability or other ink properties. At some level, though, there is no additional OD gain with increasing $Z^x$. In some cases, too much $Z^x$ may cause the OD to decrease again. In general, beneficial effects are achieved with less than about 200 ppm of $Z^x$, and typically even less than about 100 ppm.

Although the preceding discussion of $Z^x$ in terms of weight percent is provided for the sake of simple, concrete guidance, the appropriate levels of multivalent cations are related in a more complex way to factors such as molar equivalents, atomic weight and valence state; and also to the amount SDP in the ink and its level of treatment.

Further details concerning the use of multivalent cations in inks such as the first ink(s) can be found, for example, in WO03/104340, corresponding to commonly owned U.S. application Ser. No. 10/447,932 (filed May 29, 2003), the disclosures of which are incorporated by reference herein for all purposes as if fully set forth.

Colored Ink

"Colored ink" is an ink with colorant deliberately added and is suitable for creating an image. Colorant in general can be any suitable colorant including soluble colorants (dyes) and insoluble colorants (pigments, encapsulated dye). The colorant is most advantageously a pigment colorant, and especially a self-dispersing pigment (SDP).

Pigments are traditionally stabilized to dispersion by a dispersant. Preferably, when a dispersant is employed, the dispersant is a random or structured polymeric dispersant. Preferred random polymers include acrylic polymer and styrene-acrylic polymers. Most preferred are structured dispersants which include AB, BAB and ABC block copolymers, branched polymers and graft polymers. Some useful structured polymers are disclosed in U.S. Pat. No. 5,085,698, EP-A-0556649 and U.S. Pat. No. 5,231,131, the disclosures of which are incorporated by reference herein for all purposes as if fully set forth.

SDPs are surface modified pigments with dispersibility imparting groups to allow stable dispersion of the pigment without separate dispersant. For dispersion in aqueous vehicle, the surface modification involves addition of hydrophilic groups and, most typically, ionizable hydrophilic groups. See, for example, U.S. Pat. Nos. 5,554,739, 5,571,311, 5,609,671, 5,672,198, 5,698,016, 5,707,432, 5,718,746, 5,747,562, 5,749,950, 5,803,959, 5,837,045, 5,846,307, 5,851,280, 5,861,447, 5,885,335, 5,895,522, 5,922,118, 5,928,419, 5,976,233, 6,057,384, 6,099,632, 6,123,759, 6,153,001, 6,221,141, 6,221,142, 6,221,143, 6,277,183, 6,281,267, 6,329,446, 6,332,919, 6,375,317, 6,852,156, U.S.2001/0035110, EP-A-1086997, EP-A-1114851, EP-A-1158030, EP-A-1167471, EP-A-1122286, WO01/10963 and WO01/25340, the disclosures of which are incorporated by reference herein for all purposes as if fully set forth.

The SDP colorant can be further defined by its ionic character. Anionic SDP yields, in aqueous medium, particles with anionic surface charge. Conversely, cationic SDP yields, in aqueous medium, particles with cationic surface charge. Particle surface charge can be imparted, for example, by attaching groups with anionic or cationic moieties to the particle surface. The SDPs used in the present invention are preferably anionic.

Anionic moieties attached to the anionic SDP surface can be any suitable anionic moiety but are preferably (I) or (II):

$$-CO_2Z \quad (I)$$

$$-SO_3Z \quad (II)$$

wherein Z is a suitable cationic counterion, preferably selected from the group consisting of conjugate acids of organic bases; alkali metal ions; "onium" ions such as ammonium, phosphonium and sulfonium ions; and substituted "onium" ions such as tetraalkylammonium, tetraalkyl phosphonium and trialkyl sulfonium ions. Useful anionic moieties also include phosphates and phosphonates. Most preferred are type I ("carboxylate") anionic moieties.

Also preferred is a degree of functionalization wherein the density of anionic groups is less than about 3.5 µmoles per square meter of pigment surface (3.5 µmol/m$^2$), more preferably less than about 3.0 µmol/m$^2$. Degrees of functionaliztion of less than about 1.8 µmol/m$^2$, and even less than about 1.5 µmol/m$^2$, are also suitable and may be preferred for certain specific types of SDP's. As used above and otherwise herein, "degree of functionalization" refers to the amount of hydrophilic groups present on the surface of the SDP per unit surface area, measured in accordance with the method described further herein.

Carboxylated anionic SDP species include those described, for example, in previously incorporated U.S. Pat. Nos. 5,571,311, 5,609,671 and 6,852,156; and, sulfonated (type II) SDPs include those described, for example, in previously incorporated U.S. Pat. Nos. 5,571,331, 5,928,419 and EP-A-1146090.

It is desirable to use small colorant particles (for SDP and otherwise for pigments) for maximum color strength and good jetting. The particle size may generally be in the range of from about 0.005 micron to about 15 microns, is typically in the range of from about 0.005 to about 1 micron, is preferably from about 0.005 to about 0.5 micron, and is more preferably in the range of from about 0.01 to about 0.3 micron.

The levels of SDPs employed in the instant inks are those levels that are typically needed to impart the desired OD to the printed image. Typically, SDP levels are in the range of about 0.01 to about 10% by weight of the ink.

The SDPs may be black, such as those based on carbon black, or may be colored pigments such as those based on PB 15:3 and 15:4 cyan, PR 122 and 123 magenta, and PY 128 and 74 yellow.

The SDPs may be prepared by grafting a functional group or a molecule containing a functional group onto the surface of the pigment, or by physical treatment (such as vacuum plasma), or by chemical treatment (for example, oxidation with ozone, hypochlorous acid or the like). A single type or a plurality of types of hydrophilic functional groups may be bonded to one pigment particle. The type and the degree functionalization may be properly determined by taking into consideration, for example, dispersion stability in ink, color density, and drying properties at the front end of an ink jet head. Further details may be found by reference to the numerous publications incorporated above.

In one preferred embodiment, the hydrophilic functional group(s) on the SDP are primarily carboxyl groups, or a combination of carboxyl and hydroxyl groups; even more preferably the hydrophilic functional groups on the SDP are directly attached and are primarily carboxyl groups, or a combination of carboxyl and hydroxyl.

Preferred pigments in which the hydrophilic functional group(s) are directly attached may be produced, for example, by a method described in previously incorporated U.S. Pat. No. 6,852,156. Carbon black treated by the method described in this publication has a high surface active hydrogen content which is neutralized with base to provide very stable dispersions in water. Application of this method to colored pigments is also possible.

Other Ingredients

In addition to aqueous vehicle, chelator additive, colorant and soluble multivalent metal salt, the inks of the present invention can further other ingredients whose function and purpose is well known in the art. These other ingredients may be formulated into the inkjet ink, to the extent that such other ingredients do not interfere with the stability and jetablity of the ink, which may be readily determined by routine experimentation. Such other ingredients are in a general sense well known in the art.

For example, biocides may be used to inhibit growth of microorganisms.

Inclusion of sequestering agents such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediaminetetraacetic acid (CyDTA), dethylenetriamine-N,N,N',N'',N''-pentaacetic acid (DTPA), and glycoletherdiamine-N,N,N',N'-tetraacetic acid (GEDTA), and salts thereof, may be advantageous, for example, to eliminate deleterious effects of heavy metal impurities. These additives are sometimes also referred to generically as chelating agents but that term is avoided here because, in context of this invention, "chelator" has specific meaning. The sequestering agents just mentioned do not satisfy the definition of chelator specified by the present invention, but their inclusion in an inventive ink may serve some other purpose.

Polymer additives can be added as binders. The polymers can be soluble or dispersed and can be any suitable polymer, for example, soluble polymers may include linear homopolymers, copolymers or block polymers, they also can be structured polymers including graft or branched polymers, stars, dendrimers, etc. The dispersed polymers can include latexes, polyurethane dispersions, etc. The polymers may be made by any known process including but not limited to free radical, group transfer, ionic, RAFT, condensation and other types of polymerization.

When present, soluble polymer is advantageously used at levels, based on the final weight of ink, of at least 0.3% and preferably at least about 0.6%. Upper limits are dictated by ink viscosity or other physical limitations but are typically no more than about 3% soluble polymer and more typically no more than about 2%, based on the total weight of the ink.

Ink Properties

Drop velocity, separation length of the droplets, drop size and stream stability are greatly affected by the surface tension and the viscosity of the ink. Ink jet inks typically have a surface tension in the range of about 20 dyne/cm to about 70 dyne/cm at 25° C. Viscosity can be as high as 30 cP at 25° C., but is typically somewhat lower, more typically in the range of about 1 to about 20 cps. The ink has physical properties that are adjusted to the ejecting conditions and printhead design. The inks should have excellent storage stability for long periods so as not clog to a significant extent in an ink jet apparatus. Further, the ink should not corrode parts of the ink jet printing device it comes in contact with, and it should be essentially odorless and non-toxic. The inks are particularly suited for drop on demand inkjet printheads, especially thermal and piezo printheads.

Proportions of Ingredients

The components described herein can be combined in various proportions and combinations to make an ink with the desired ink properties, as generally described above, and as otherwise generally recognized by those of ordinary skill in the art. Some experimentation may be necessary to optimize inks for a particular end use, but such optimization is generally within the ordinary skill in the art.

The amount of vehicle in an ink is typically in the range of about 70% to about 99.8%, and preferably about 80% to about 99.8%, by weight based on total weight of the ink.

The chelator is generally present in amounts of about 2% or less, and more typically in the range of about 0.1% to about 1.0%, by weight based on the total ink weight.

In a colored ink, colorant will generally be present in amounts up to about 12%, and more typically in the range of about 0.1 to about 9%, by weight based on total weight of the ink. Dispersants, when needed for stabilization of an insoluble colorant, are employed at levels based on the amount of colorant and are usually expressed as a weight ratio. Generally, dispersants are employed at a pigment-to-dispersant weight ratio in the range of about 1:3 to about 4:1.

Other ingredients (additives), when present, generally comprise less than about 15% by weight, based on total weight of the ink. Surfactants, when added, are generally in the range of about 0.2% to about 3%, by weight based on the total weight of the ink.

Ink Set

In another aspect, the present invention pertains to an ink set comprising (at least) a first inkjet ink and a second inkjet ink, wherein the first inkjet ink is substantially colorless and comprises a first aqueous vehicle and chelate, the second inkjet ink is a colored ink comprising a colorant stably dispersed or dissolved in a second aqueous vehicle. The colorant is preferably a pigment and even more preferably an SDP, which is stably dispersed in the second aqueous vehicle. Either one, or both, of the first and second inks can further comprise a multivalent metal cation. In this embodiment, the first inkjet ink is utilized as a fixer for the second inkjet ink when printed according to the printing method of the present invention.

Preferably, the ink sets in accordance with the present invention comprise, in addition to the first inkjet ink (substantially colorless), at least three differently colored inks (such as CMY), and preferably at least four differently colored inks (such as CMYK), wherein each of the colored inks individually comprises an appropriate colorant stably dispersed or dissolved in an aqueous vehicle. The colorant in one or more of the colored inks is preferably a pigment, and more preferably an SDP, and particularly in the black (K) ink. One or more of the colorless and colored inks (one or more) can further comprise a multivalent metal cation.

Ink sets in accordance with the present invention may also comprise at least three differently colored inks (such as CMY), and preferably at least four different colored inks (such as CMYK), wherein at least one the inks is an inkjet ink comprising a colorant stably dispersed or dissolved in an aqueous vehicle, and further comprising the chelator additive. Preferably, the colorant is a pigment, and more preferably an SDP. Preferably the colorant in all of the inks is a pigment. Particularly preferred is an ink set having a black ink containing an SDP and the chelator, and optionally a multivalent cation.

Inkjet Printing Method

Another preferred aspect of the present invention pertains to an inkjet printing method wherein a substantially colorless ink (e.g., the first inkjet ink referenced above) is used as a fixer fluid for colored ink(s) and is applied over or under the colored ink.

Preferably, the fixer fluid is applied to the substrate first and then the colored ink is printed on top of the applied fixer fluid. As described hereinafter, the fixer fluid (first ink) need not fill the entire printed area to be effective. In fact, the area filled by the fixer fluid can be a fraction of the area covered by the ink, as discussed in further detail below.

Fixer Fluid

A fixer fluid is an "ink" with fixing agent, but not necessarily colorant. The fixer fluid can, if desired, contain colorant, but that may limit the application to the fixation of black ink only. Preferably, the fixer fluid contains substantially no colorant, and is substantially colorless (clear, achromatic). Also, preferably, the fixer fluid can be printed on the substrate and leave no visible marking.

The fixer fluid contains an "effective amount" of fixing agent to achieve an improvement in OD and/or rub-fastness as compared to an ink set without the presence of the fixer. The upper concentration limit of fixing agent(s) in the fixer fluid will generally be dictated by practical considerations as understood by those of ordinary skill in the art such as, for example, the preference that the fixer fluid is substantially colorless and/or leaves no visible marking on the printed substrate and jets well.

The fixer fluid is preferably formulated for high spread and quick penetration and drying. To achieve these properties, surfactants and/or penetrating solvents will typically be employed. The surface tension is preferably less than about 40 mN/m.

The fixer fluid will typically be deposited on the substrate before the colored ink (underprinted), and preferably substantially only in areas subsequently printed with colored ink. The area covered by the fixer fluid (area fill) need not, however, entirely fill the area printed with colored ink. Also, the colored ink need not fall (entirely) on top of the printed fixer fluid. The area fill of underprinted fixer fluid can be, and preferably is, substantially less than the area fill of overprinted colored ink. The need for only a small amount of fixer area fill is highly advantageous as this decreases the liquid load the substrate must handle. High liquid load can result in cockle or curl of paper substrate.

Substrate

The instant invention is particularly advantageous for printing on plain paper such as common electrophotographic copier paper, although it can be applied to all substrates suitable for use in inkjet printing applications.

EXAMPLES

Dispersion 1

Carbon black (Nipex 180 from Degussa, surface area 260 $m^2/g$) was oxidized with ozone according to the process described in U.S. Pat. No. 6,852,156. After recovery, a 17 weight percent dispersion of self-dispersing carbon black pigment in water was obtained with a viscosity of 6.4 cps (25° C.). The median particle size was 90 nm and the acid number (degree of functionalization) was less than 2.8 $\mu mol/m^2$.

The degree of functionalization (acid value) of this SDP (and others in these examples made by the process according to U.S. Pat. No. 6,852,156) was determined by the equivalent moles of base required to neutralize the treated pigment to a pH of 7. As the surface hydrophilic groups are substantially all acidic, the acid value also equals the degree of functionalization.

Equivalent moles of base can be determined by titration or, in the case of inorganic bases such as alkali metal hydroxides, by atomic absorption (AA) or Inductive Coupled Plasma (ICP) analysis. Moles of base per gram of SDP is obtained and converted to $\mu mol/m^2$ by dividing by the surface area of the pigment and adjusting the units appropriately. For accuracy, the neutralized sample must be free of contaminants, such as free acids or salts, which would interfere with the measurement.

Dispersion 2

Carbon black (S-160 from Degussa, surface area 150 $m^2/g$) was oxidized with ozone according to the process described in U.S. Pat. No. 6,852,156 and neutralized with LiOH. After recovery, a 16.6 weight percent dispersion of self-dispersing carbon black pigment in water was obtained with a viscosity of 3.5 cps (25° C.). The median particle size was 110 nm and the acid number (degree of functionalization) was 3.3 $\mu mol/m^2$. The degree of functionalization, as measured, was slightly above the target level of <3.0 $\mu mol/m^2$.

Dispersion 3

Cabojet® 300 (a self-dispersing carbon black pigment with grafted carboxylic acid groups, from Cabot Corporation) was obtained dispersed in water at 15 weight percent concentration, and was used as received.

Dispersion 4

Bonjet® CW-2 (a self-dispersing carbon black pigment with directly attached carboxylic acid groups, from Orient Chemical Co.) was obtained dispersed in water at 18 weight percent concentration, and was used as received.

Binder 1

A 3-liter flask was equipped with a mechanical stirrer, thermocouple, $N^2$ inlet, condenser, drop funnel and syringe pump. Tetrahydrofuran (950 g), 1,1-bis(trimethylsiloxy) 2-methyl propene (46.2 g) and tetrabutylammonium m-chlorobenzoate (2 g) was added into pot. Feed I (tetrahydrofuran (5 g) and tetrabutylammonium m-chlorobenzoate (0.8 g)) and Feed II (benzyl methacrylate (600 g), 2-(trimethylsiloxy)ethyl methacrylate (312 g), ethyltriethyleneglycol methacrylate (100 g) and trimethylsilyl methacrylate (152 g)) were started at time 0 minutes. Feed I was added over 200 minutes. Feed II was added over 60 minutes. After 360 minutes 90 g of methanol was added to the pot. The pot was heated to reflux and 500 g were distilled. A solution of water (124 g) and dichloroacetic acid (0.2 g) were added to the pot and refluxed for 60 minutes. After refluxing, 725 g were distilled and 2-pyrrolidinone (889 g) was added. This synthesis produced a random acrylic polymer of 60 wt % benzyl methacrylate, 20 wt % 2-hydroxyethyl methacrylate, 10 wt % ethyltriethyleneglycol methacrylate and 10 wt % methacrylic acid at a $M_n$ of 5300. The final solution contained 52% polymer solids in 2-pyrrolidinone.

Ink Preparation

Inks were prepared by first mixing the vehicle and additives together and then slowly adding the dispersion with stirring. Ingredient amounts are in percent weight of the total weight of ink, unless otherwise stated. The water used to dilute the inks is deionized. The ingredient Surfynol® 465 is a surfactant from Air Products Corporation (Allentown, Pa., USA).

Evaluation

All the inks were printed with a Canon i550 printer using a cleaned out black cartridge and "High Quality" print mode. The fixers were printed on the same printer but using the color cartridges. Optical density of the prints was measured using a Greytag-Macbeth SpectroEye (Greytag-Macbeth AG, Regensdorf, Switzerland). Print patterns were created in CorelDraw (Corel Corporation) and the software was also used to control the area fill of the fixer. Fixer was printed at the desired area fill and covered the entire page. The page was then re-fed to the printer and the ink was then printed (100% area fill) on top of the fixer. Typically there was a period of 3 to 5 seconds between printing the fixer and printing the ink. Extending this period to 24 hours made no significant difference to the change in OD obtained.

Example 1

This demonstrates the effect of multivalent cation (copper acetate) and phenanthroline on the SDP of Dispersion 1. Ink 1d with both copper acetate and phenanthroline gives higher optical density and lower paper-to-paper variability than the comparative ink 1b with only copper acetate. When chelator was used in ink without multivalent cation, it was most effective as a fixer.

| Ingredient | Ink 1a (Comp) | Ink 1b (Comp) | Ink 1c | Ink 1d |
|---|---|---|---|---|
| Dispersion 1 (as % pigment) | 3.0% | 3.0% | 3.0% | 3.0% |
| Copper acetate monohydrate | — | 0.1% | — | 0.1% |
| Phenanthroline | — | — | 0.1% | 0.1% |
| Glycerol | 10% | 10% | 10% | 10% |
| 1,2-Hexanediol | 5% | 5% | 5% | 5% |
| 2-Pyrrolidinone | 3% | 3% | 3% | 3% |
| Surfynol ® 465 | 0.1% | 0.1% | 0.1% | 0.1% |
| Triethanolamine | 0.2% | 0.2% | 0.2% | 0.2% |
| Deionized Water | Bal. to 100% | Bal. to 100% | Bal. to 100% | Bal. to 100% |

| | Optical Density | | | |
|---|---|---|---|---|
| Paper | Ink 1a (Comp) | Ink 1b (Comp) | Ink 1c | Ink 1d |
| HP Office | 1.13 | 1.32 | 1.14 | 1.43 |
| Hammermill Copy Plus | 1.30 | 1.41 | 1.32 | 1.50 |
| Xerox 4024 | 1.33 | 1.39 | 1.37 | 1.43 |
| Average | 1.25 | 1.37 | 1.28 | 1.45 |
| Normalized standard deviation | 8.6% | 3.4% | 9.5% | 2.8% |

Example 2

This example shows a comparison of other potential chelators—oxalic acid, 2,4-pentanedione and EDTA. The combination of multivalent cation (copper acetate) and chelating agents are ineffective or less effective at increasing optical density compared to the use of a chelator in accordance with the present invention, such as phenanthroline (demonstrated in 1d).

| Ingredient | Ink 2a (Comp) | Ink 2b (Comp) | Ink 2c (Comp) |
|---|---|---|---|
| Dispersion 1 (as % pigment) | 3.0% | 3.0% | 3.0% |
| Copper acetate monohydrate | 0.1% | 0.15 | 0.1% |
| Oxalic acid | 0.1% | — | — |
| 2,4-Pentanedione | — | 0.1% | — |
| EDTA | — | — | 0.2% |
| Glycerol | 10% | 10% | 10% |
| 1,2-Hexanediol | 5% | 5% | 5% |
| 2-Pyrrolidinone | 3% | 3% | 3% |
| Surfynol ® 465 | 0.1% | 0.1% | 0.1% |
| Triethanolamine | 0.2% | 0.2% | 0.2% |
| Deionized water | Bal. to 100% | Bal. to 100% | Bal. to 100% |

| | Optical Density | | |
|---|---|---|---|
| Paper | Ink 2a (Comp) | Ink 2b (Comp) | Ink 2c (Comp) |
| HP Office | 1.29 | 1.23 | 1.34 |
| Hammermill Copy Plus | 1.44 | 1.38 | 1.44 |
| Xerox 4024 | 1.36 | 1.37 | 1.41 |
| Average | 1.36 | 1.33 | 1.40 |
| Normalized standard deviation | 5.5% | 6.3% | 3.7% |

Example 3

An ink made with calcium nitrate and phenanthroline using Dispersion 1 aggregated and could not be filtered cleanly through a 0.5 micron filter.

| Ingredient | Ink 3 |
|---|---|
| Dispersion 1 (as % pigment) | 3.0% |
| Calcium nitrate tetrahydrate | 0.1% |
| 1,10-Phenanthroline | 0.15 |
| Glycerol | 10% |
| 1,2-Hexanediol | 5% |
| 2-Pyrrolidinone | 3% |
| Surfynol ® 465 | 0.1% |
| Triethanolamine | 0.2% |
| Deionized water | Balance to 100% |

Example 4

The following inks with Dispersion 2 were prepared and evaluated. The combination of multivalent metal salt (copper nitrate) and inventive chelator (phenanthroline) together give higher optical density and lower paper to paper variability than the control ink or ink with only chelator.

| Ingredient | Ink 4a (Comp) | Ink 4b (Comp) | Ink 4c | Ink 4d |
|---|---|---|---|---|
| Dispersion 2 (as % pigment) | 3.0% | 3.0% | 3.0% | 3.0% |
| Copper nitrate hemipentahydrate | — | 0.1% | — | 0.1% |
| Phenanthroline | — | — | 0.1% | 0.1% |
| Glycerol | 10% | 10% | 10% | 10% |
| 1,2-Hexanediol | 5% | 5% | 5% | 5% |
| 2-Pyrrolidinone | 3% | 3% | 3% | 3% |
| Surfynol ® 465 | 0.1% | 0.1% | 0.1% | 0.1% |
| Triethanolamine | 0.2% | 0.2% | 0.2% | 0.2% |
| Deionized water | Bal. to 100% | Bal. to 100% | Bal. to 100% | Bal. to 100% |

| | Optical Density | | | |
|---|---|---|---|---|
| Paper | Ink 4a (Comp) | Ink 4b (Comp) | Ink 4c | Ink 4d |
| HP Office | 1.32 | 1.31 | 1.12 | 1.43 |
| Hammermill Copy Plus | 1.23 | 1.46 | 1.27 | 1.50 |
| Xerox 4024 | 1.31 | 1.43 | 1.37 | 1.52 |
| Average | 1.29 | 1.40 | 1.25 | 1.50 |
| Normalized standard deviation | 3.8% | 5.7% | 10.1% | 3.2% |

Example 5

The following inks with Dispersion 2 were prepared and evaluated. The combination of multivalent metal salt (copper acetate) and inventive chelator (phenanthroline) together give higher optical density and lower paper to paper variability than the control ink with only multivalent metal salt. Also, the results with copper acetate as the multivalent metal salt are comparable to Example 4 with copper nitrate as the multivalent metal salt.

| Ingredient | Ink 5a (Comp) | Ink 5b |
|---|---|---|
| Dispersion 2 (as % pigment) | 3.0% | 3.0% |
| Copper acetate hydrate | 0.1% | 0.1% |
| Phenanthroline | — | 0.1% |
| Glycerol | 10% | 10% |
| 1,2-Hexanediol | 5% | 5% |
| 2-Pyrrolidinone | 3% | 3% |
| Surfynol ® 465 | 0.1% | 0.1% |
| Triethanolamine | 0.2% | 0.2% |
| Deionized water | Bal. to 100% | Bal. to 100% |

| | Optical Density | |
|---|---|---|
| Paper | Ink 5a (Comp) | Ink 5b |
| HP Office | 1.34 | 1.43 |
| Hammermill Copy Plus | 1.40 | 1.49 |
| Xerox 4024 | 1.45 | 1.51 |
| Average | 1.40 | 1.48 |
| Normalized standard deviation | 3.9% | 2.8% |

Example 6

The following inks with Dispersion 3 were prepared and evaluated. The dispersion gave lower OD overall than Dispersions 1 and 2 in the previous examples. And, unlike the other dispersions, the combination of metal salt and chelator in Ink 6d did not enhance OD over metal salt alone in Ink 6b. The formulation in this example may not be optimized, or perhaps the variety of SDP represented by Dispersion 3 in not as well suited for application with this invention as other dispersions.

| Ingredient | Ink 6a (Comp) | Ink 6b (Comp) | Ink 6c | Ink 6d |
|---|---|---|---|---|
| Dispersion 3 (as % pigment) | 3.0% | 3.0% | 3.0% | 3.0% |
| Copper acetate hydrate | — | 0.1% | — | 0.1% |
| 1,10-Phenanthroline | — | — | 0.1% | 0.1% |
| Glycerol | 10% | 10% | 10% | 10% |
| 1,2-Hexanediol | 5% | 5% | 5% | 5% |
| 2-Pyrrolidinone | 3% | 3% | 3% | 3% |
| Surfynol ® 465 | 0.1% | 0.1% | 0.1% | 0.1% |
| Triethanolamine | 0.2% | 0.2% | 0.2% | 0.2% |
| Deionized water | Bal. to 100% | Bal. to 100% | Bal. to 100% | Bal. to 100% |

| | Optical Density | | | |
|---|---|---|---|---|
| Paper | Ink 6a (Comp) | Ink 6b (Comp) | Ink 6c | Ink 6d |
| HP Office | — | 1.15 | 1.07 | 1.27 |
| Hammermill Copy Plus | — | 1.31 | 1.17 | 1.24 |
| Xerox 4024 | — | 1.21 | 1.17 | 0.99 |
| Average | 1.15 | 1.22 | 1.14 | 1.17 |
| Normalized standard deviation | — | 6.6% | 5.1% | 10.1% |

Example 7

The following inks with Dispersion 4 were prepared and evaluated.

Like Dispersion 3 in the previous example, the use of Dispersion 4 provided lower OD overall than Dispersions 1 and 2 in the previous examples. Although the combination of multivalent metal salt and chelator in Ink 7c seems to enhance OD slightly over Control Ink 6b, the optical densities in general are relatively low. Although the formulation in this example may not be optimized, most likely the SDP of Dispersion 4 is not as advantageous for achieving high optical density as the SDP of Dispersions 1 and 2.

| Ingredient | Ink 7a Comp) | Ink 7b (Comp) | Ink 7c |
|---|---|---|---|
| Dispersion 4 (as % pigment) | 3.0% | 3.0% | 3.0% |
| Copper acetate hydrate | — | 0.1% | 0.1% |
| Phenanthroline | — | — | 0.1% |
| Glycerol | 10% | 10% | 10% |
| 1,2-Hexanediol | 5% | 5% | 5% |
| 2-Pyrrolidinone | 3% | 3% | 3% |
| Surfynol ® 465 | 0.1% | 0.1% | 0.1% |
| Triethanolamine | 0.2% | 0.2% | 0.2% |
| Deionized water | Bal. to 100% | Bal. to 100% | Bal. to 100% |

| | Optical Density | | |
|---|---|---|---|
| Paper | Ink 7a (Comp) | Ink 7b (Comp) | Ink 7c |
| HP Office | 1.06 | 1.14 | 1.17 |
| Hammermill Copy Plus | 1.14 | 1.22 | 1.26 |
| Xerox 4024 | 1.21 | 1.28 | 1.27 |
| Average | 1.14 | 1.21 | 1.23 |
| Normalized standard deviation | 6.6% | 5.8% | 4.5% |

Example 8

This example demonstrates the advantage of an uncolored chelator-containing ink as a fixer. The following fixer inks and colored inks with Dispersion 1 were prepared and evaluated. The colored inks were underprinted with fixer. A fixer with chelator alone can be effective, but generally OD is enhanced more in combination with multivalent metal salt.

| Ingredient | Ink 8a | Ink 8b |
|---|---|---|
| Dispersion 1 (as % pigment) | 3.0% | 3.0% |
| Binder 1 | — | 1.0% |
| Glycerol | 15.0% | 15.0% |
| Ethylene glycol | 5.0% | 5.0% |
| 1,2-Hexanediol | 5.0% | 5.0% |
| 2-Pyrrolidinone | 3.0% | 3.0% |
| Surfynol ® 465 | 0.2% | 0.2% |
| Triethanolamine | 0.2% | 0.2% |
| Deionized water | Bal. to 100% | Bal. to 100% |

| Ingredient | Fixer 1 | Fixer 2 | Fixer 3 |
|---|---|---|---|
| Copper nitrate hemipentahydrate | 3.5% | — | 3.5% |
| 1,10-Phenanthroline | — | 1.0% | 1.0% |
| 1,5-Pentanediol | 10.0% | 10.0% | 10.0% |
| Tetraethylene glycol | 6.0% | 6.0% | 6.0% |
| 2-Pyrrolidinone | 4.0% | 4.0% | 4.0% |
| Surfynol ® 465 | 0.5% | 0.5% | 0.5% |
| Deionized water | Bal. to 100% | Bal. to 100% | Bal. to 100% |

| | Optical of Ink 8a underprinted with Fixer | | | |
|---|---|---|---|---|
| Paper | No Fixer | Fixer 1 | Fixer 2 | Fixer 3 |
| HP Office | 1.08 | 1.38 | 1.17 | 1.41 |
| Hammermill Copy Plus | 1.18 | 1.48 | 1.42 | 1.52 |
| Xerox 4024 | 1.32 | 1.41 | 1.37 | 1.44 |
| Average | 1.19 | 1.42 | 1.32 | 1.46 |

| | Optical Density of Ink 8b underprinted with Fixer | | | |
|---|---|---|---|---|
| Paper | No Fixer | Fixer 1 | Fixer 2 | Fixer 3 |
| HP Office | 1.05 | 1.27 | 1.05 | 1.26 |
| Hammermill Copy Plus | 1.10 | 1.34 | 1.10 | 1.30 |
| Xerox 4024 | 1.16 | 1.35 | 1.15 | 1.29 |
| Average | 1.10 | 1.32 | 1.10 | 1.28 |

Example 9

The following inks with Dispersion 2 were prepared and evaluated. This example demonstrates additional inventive chelators 2,2-dipyridyl and 2,2-dipyridylamine. The non-chelating species 4,7-phenanthroline adds nothing to the OD.

| Ingredient | Ink 9a | Ink 9b | Ink 9c |
|---|---|---|---|
| Dispersion 2 (as % pigment) | 3.0% | 3.0% | 3.0% |
| Copper nitrate hemipentahydrate | 0.1% | 0.1% | 0.1% |
| 4,7-Phenanthroline | 0.1% | — | — |
| 2,2-Dipyridyl | — | 0.1% | — |
| 2,2-Dipyridylamine | — | — | 0.15 |
| Glycerol | 10% | 10% | 10% |
| 1,2-Hexanediol | 5% | 5% | 5% |
| 2-Pyrrolidinone | 3% | 3% | 3% |
| Surfynol ® 465 | 0.1% | 0.1% | 0.1% |
| Triethanolamine | 0.2% | 0.2% | 0.2% |
| Deionized water | Bal. to 100% | Bal. to 100% | Bal. to 100% |

| | Optical Density | | | |
|---|---|---|---|---|
| | Ink 4b | Ink 9a | Ink 9b | Ink 9c |
| HP Office | 1.31 | 1.27 | 1.33 | 1.33 |
| Hammermill Copy Plus | 1.46 | 1.42 | 1.45 | 1.47 |
| Xerox 4024 | 1.43 | 1.47 | 1.46 | 1.51 |
| Average | 1.40 | 1.39 | 1.41 | 1.44 |
| Normalized standard deviation | 5.7% | 7.5% | 5.1% | 6.6% |

When the inks were made without the copper nitrate present, none of the inks showed a significant change in optical density.

| Ingredient | Ink 9d | Ink 9e |
|---|---|---|
| Dispersion 2 (as % pigment) | 3.0% | 3.0% |
| 2,2-Dipyridyl | 0.1% | — |
| 2,2-Dipyridylamine | — | 0.1% |
| Glycerol | 10% | 10% |
| 1,2-Hexanediol | 5% | 5% |
| 2-Pyrrolidinone | 3% | 3% |
| Surfynol ® 465 | 0.1% | 0.1% |
| Triethanolamine | 0.2% | 0.2% |
| Deionized water | Bal. to 100% | Bal. to 100% |

| | Optical Density | |
|---|---|---|
| Paper | Ink 9d | Ink 9e |
| HP Office | 1.09 | 1.08 |
| Hammermill Copy Plus | 1.26 | 1.21 |
| Xerox 4024 | 1.32 | 1.34 |
| Average | 1.22 | 1.21 |
| Normalized standard deviation | 9.8% | 10.7% |

Example 10

The following inks with Dispersion 1 were prepared and evaluated. This example demonstrates the effect of increasing the ratio of chelator (2,2-dipyridylamine) to multivalent metal ($Cu^{2+}$) in the ink. The optical density increases with increasing 2,2-dipyridylamine up to a molar ratio of about 4 where it appears to level off.

| Ingredient | Ink 10a | Ink 10b | Ink 10c | Ink 10d | Ink 10e |
|---|---|---|---|---|---|
| Dispersion 1 (as % pigment) | 3.0% | 3.0% | 3.0% | 3.0% | 3.0% |
| Copper nitrate hemipentahydrate | 0.05% | 0.05% | 0.05% | 0.05% | 0.05% |
| 2,2-Dipyridylamine | — | 0.037% | 0.11% | 0.147% | 0.20% |
| 1,2-Hexanediol | 5.0% | 5.0% | 5.0% | 5.0% | 5.0% |
| Glycerol | 10.0% | 10.0% | 10.0% | 10.0% | 10.0% |
| Surfynol ® 465 | 0.1% | 0.1% | 0.1% | 0.1% | 0.1% |
| Triethanolamine | 0.2% | 0.2% | 0.2% | 0.2% | 0.2% |
| 2-Pyrrolidinone | 3.0% | 3.0% | 3.0% | 3.0% | 3.0% |
| Deionized water | Bal. to 100% | Bal. to 100% | Bal. to 100% | Bal. to 100% | Bal. to 100% |
| Molar ratio of 2,2-dipyridyl-amine to copper | — | 1.0 | 3.0 | 4.0 | 5.0 |

| | Optical Density | | | | |
|---|---|---|---|---|---|
| Paper | Ink 10a | Ink 10b | Ink 10c | Ink 10d | Ink 10e |
| HP Office | 1.20 | 1.21 | 1.23 | 1.25 | 1.26 |
| Hammermill Copy Plus | 1.33 | 1.39 | 1.42 | 1.45 | 1.42 |
| Xerox 4024 | 1.38 | 1.41 | 1.44 | 1.43 | 1.45 |
| Average | 1.30 | 1.34 | 1.36 | 1.38 | 1.38 |

Example 11

The following inks with Dispersion 1 were prepared and evaluated. These examples demonstrate the effect of increasing the ratio of 2,2-dipyridyl chelator to $Cu^{2+}$ multivalent metal in the ink. The optical density increased with higher ratios of 2,2-dipyridyl.

| Ingredient | Ink 11a | Ink 11b | Ink 11c | Ink 11d |
|---|---|---|---|---|
| Dispersion 1 (as % pigment) | 3.0% | 3.0% | 3.0% | 3.0% |
| Copper nitrate hemipentahydrate | 0.05% | 0.05% | 0.05% | 0.05% |
| 2,2-Dipyridyl | — | 0.034% | 0.10% | 0.167% |
| 1,2-Hexanediol | 5.0% | 5.0% | 5.0% | 5.0% |
| Glycerol | 10.0% | 10.0% | 10.0% | 10.0% |
| Surfynol ® 465 | 0.1% | 0.1% | 0.1% | 0.1% |
| Triethanolamine | 0.2% | 0.2% | 0.2% | 0.2% |
| 2-Pyrrolidinone | 3.0% | 3.0% | 3.0% | 3.0% |
| Deionized water | Bal. to 100% | Bal. to 100% | Bal. to 100% | Bal. to 100% |
| Molar ratio of 2,2-dipyridyl to copper | — | 1.0 | 3.0 | 5.0 |

| | Optical Density | | | |
|---|---|---|---|---|
| Paper | Ink 11a | Ink 11b | Ink 11c | Ink 11d |
| HP Office | 1.20 | 1.20 | 1.20 | 1.23 |
| Hammermill Copy Plus | 1.33 | 1.36 | 1.31 | 1.39 |
| Xerox 4024 | 1.38 | 1.39 | 1.39 | 1.42 |
| Average | 1.30 | 1.32 | 1.30 | 1.35 |

Example 12

The following inks with Dispersion 2 were prepared and evaluated. This example demonstrates calcium, cobalt and iron as the multivalent cation. The transition metals cobalt, iron and copper (previous examples), which can form coordination complexes, tended to be more effective in combination with chelator than the alkali metal cation, calcium.

| Ingredient | Ink 12a (Control) | Ink 12b | Ink 12c | Ink 12d (Control) | Ink 12e | Ink 12f | Ink 12g (Control) | Ink 12h | Ink 12i |
|---|---|---|---|---|---|---|---|---|---|
| Dispersion 1 (as % pigment) | 3.0% | 3.0% | 3.0% | 3.0% | 3.0% | 3.0% | 3.0% | 3.0% | 3.0% |
| Calcium nitrate | 0.05% | 0.05% | 0.05% | — | — | — | — | — | — |
| Cobalt sulfate hydrate | — | — | — | 0.05% | 0.05% | 0.05% | — | — | — |
| Iron (III) sulfate hydrate | — | — | — | — | — | — | 0.05% | 0.05% | 0.05% |
| 2,2-Dipyridyl | — | 0.134% | — | — | 0.134% | — | — | 0.134% | — |
| 2,2-Dipyridylamine | — | — | 0.15% | — | — | 0.15% | — | — | 0.15% |
| 1,2-Hexanediol | 5.0% | 5.0% | 5.0% | 5.0% | 5.0% | 5.0% | 5.0% | 5.0% | 5.0% |
| Glycerol | 10.0% | 10.0% | 10.0% | 10.0% | 10.0% | 10.0% | 10.0% | 10.0% | 10.0% |
| Surfynol ® 465 | 0.1% | 0.1% | 0.1% | 0.1% | 0.1% | 0.1% | 0.1% | 0.1% | 0.1% |
| Triethanolamine | 0.2% | 0.2% | 0.2% | 0.2% | 0.2% | 0.2% | 0.2% | 0.2% | 0.2% |
| 2-Pyrrolidinone | 3.0% | 3.0% | 3.0% | 3.0% | 3.0% | 3.0% | 3.0% | 3.0% | 3.0% |
| Deionized water | Balance to 100% | Balance to 100% | Balance to 100% | Balance to 100% | Balance to 100% | Balance to 100% | Balance to 100% | Balance to 100% | Balance to 100% |

| | Optical Density | | | | | | | | |
|---|---|---|---|---|---|---|---|---|---|
| Paper | Ink 12a | Ink 12b | Ink 12c | Ink 12d | Ink 12e | Ink 12f | Ink 12g | Ink 12h | Ink 12i |
| HP Office | 1.26 | 1.22 | 1.26 | 1.23 | 1.35 | 1.27 | 1.23 | 1.25 | 1.20 |
| Hammermill Copy Plus | 1.42 | 1.37 | 1.44 | 1.39 | 1.44 | 1.42 | 1.32 | 1.43 | 1.39 |
| Xerox 4024 | 1.40 | 1.41 | 1.44 | 1.40 | 1.44 | 1.43 | 1.38 | 1.38 | 1.38 |
| Average | 1.36 | 1.33 | 1.38 | 1.34 | 1.41 | 1.37 | 1.31 | 1.35 | 1.32 |

Example 13

The following inks with Dispersion 1, ethylene diamine chelator and various multivalent metal salts were prepared and evaluated. The optical densities were higher than the inks made without ethylene diamine (Control inks in Example 12).

| Ingredient | Ink 13a | Ink 13b | Ink 13c | Ink 13d |
|---|---|---|---|---|
| Dispersion 1 (as % pigment) | 3.0% | 3.0% | 3.0% | 3.0% |
| Copper nitrate hemipentahydrate | 0.05% | — | — | — |
| Calcium nitrate tetrahydrate | — | 0.05% | — | — |
| Cobalt sulfate hydrate | — | — | 0.06% | — |
| Iron (III) sulfate hydrate | — | — | — | 0.05% |
| Ethylene diamine | 0.05% | 0.05% | 0.05% | 0.05% |
| 1,2-Hexanediol | 5.0% | 5.0% | 5.0% | 5.0% |
| Glycerol | 10.0% | 10.0% | 10.0% | 10.0% |
| Surfynol ® 465 | 0.1% | 0.1% | 0.1% | 0.1% |
| Triethanolamine | 0.2% | 0.2% | 0.2% | 0.2% |
| 2-pyrrolidinone | 3.0% | 3.0% | 3.0% | 3.0% |
| Deionized water | Bal. to 100% | Bal. to 100% | Bal. to 100% | Bal. to 100% |

| | Optical Density | | | |
|---|---|---|---|---|
| Paper | Ink 13a | Ink 13b | Ink 13c | Ink 13d |
| HP Office | 1.33 | 1.34 | 1.38 | 1.32 |
| Hammermill Copy Plus | 1.39 | 1.42 | 1.47 | 1.43 |
| Xerox 4024 | 1.43 | 1.43 | 1.48 | 1.42 |
| Average | 1.38 | 1.40 | 1.44 | 1.39 |

Example 14

The following inks with Dispersion 1 were prepared and evaluated. This example compared 4,7-phenanthroline (non-chelating phenanthroline isomer) with 1,10-phenanthroline chelator. Inks made with the 4,7-isomer had little effect compared to the 1,10-phenanthroline.

| Ingredients | 14a (Comp) | 14b (Comp) | 14c | 14d (Comp) | 14e |
|---|---|---|---|---|---|
| Dispersion 1 (as % pigment) | 3.0% | 3.0% | 3.0% | 3.0% | 3.0% |
| Copper nitrate hemipentahydrate | 0.05% | — | — | 0.05% | 0.05% |
| 4,7-Phenanthroline | — | 0.1% | — | 0.1% | — |
| 1,10-Phenanthroline | — | — | 0.1% | — | 0.1% |
| 1,2-Hexanediol | 5.0% | 5.0% | 5.0% | 5.0% | 5.0% |
| Glycerol | 10.0% | 10.0% | 10.0% | 10.0% | 10.0% |
| Surfynol ® 465 | 0.1% | 0.1% | 0.1% | 0.1% | 0.1% |
| Triethanolamine | 0.2% | 0.2% | 0.2% | 0.2% | 0.2% |
| 2-Pyrrolidinone | 3.0% | 3.0% | 3.0% | 3.0% | 3.0% |
| Deionized water | Bal. to 100% | Bal. to 100% | Bal. to 100% | Bal. to 100% | Bal. to 100% |

| | Optical Density | | | | |
|---|---|---|---|---|---|
| Paper | 14a | 14b | 14c | 14d | 14e |
| HP Office | 1.16 | 1.11 | 1.12 | 1.17 | 1.23 |
| Hammermill Copy Plus | 1.25 | 1.24 | 1.25 | 1.30 | 1.41 |
| Xerox 4024 | 1.33 | 1.31 | 1.29 | 1.36 | 1.40 |
| Average | 1.25 | 1.22 | 1.22 | 1.28 | 1.35 |

The invention claimed is:

1. An inkjet ink comprising an aqueous vehicle and a chelator, wherein the chelator comprises a non-polymeric molecule having at least two coordinating nitrogen atoms and no carboxyl groups and wherein either a) the ink is substantially colorless or b) the ink further comprises a self-dispersing pigment colorant.

2. The inkjet ink of claim 1, wherein the chelator is selected from the group consisting of phenanthroline, 2,2-dipyridyl, 2,2-dipyridylamine and ethylene diamine, and derivatives thereof.

3. The inkjet ink of claim 1, having a surface tension in the range of about 20 dyne/cm to about 70 dyne/cm at 25° C., and a viscosity as high as 30 cP at 25° C.

4. The inkjet ink of claim 1, wherein the ink is substantially colorless.

5. The inkjet ink of claim 4, wherein the chelator is selected from the group consisting of phenanthroline, 2,2-dipyridyl, 2,2-dipyridylamine and ethylene diamine, and derivatives thereof.

6. The inkjet ink of claim 4, having a surface tension in the range of about 20 dyne/cm to about 70 dyne/cm at 25° C., and a viscosity as high as 30 cP at 25° C.

7. The inkjet ink of claim 1, wherein the ink comprises a self-dispersing pigment colorant.

8. The inkjet ink of claim 7, wherein the chelator is present at a level effective to increase optical density over the same ink without chelator.

9. The inkjet ink of claim 7, having a surface tension in the range of about 20 dyne/cm to about 70 dyne/cm at 25° C., and a viscosity as high as 30 cP at 25° C.

10. The inkjet ink of claim 7, further comprising a multivalent cationic metal species.

11. The inkjet ink of claim 7, wherein the chelator is selected from the group consisting of phenanthroline, 2,2-dipyridyl, 2,2-dipyridylamine and ethylene diamine, and derivatives thereof.

12. An inkjet ink set comprising a first inkjet ink and a second inkjet ink, wherein the first inkjet ink is a substantially colorless inkjet ink comprising an aqueous vehicle and a chelator, wherein the chelator comprises a non-polymeric molecule having at least two coordinating nitrogen atoms and no carboxyl groups, and the second inkjet ink is a colored ink comprising of an aqueous vehicle and pigment colorant.

13. The inkjet ink set of claim 12, wherein the chelator in the first inkjet ink is selected from the group consisting of phenanthroline, 2,2-dipyridyl, 2,2-dipyridylamine and ethylene diamine, and derivatives thereof.

14. The inkjet ink set of claim 12, wherein the first inkjet ink has a surface tension in the range of about 20 dyne/cm to about 70 dyne/cm at 25° C., and a viscosity as high as 30 cP at 25° C.

15. An inkjet ink set comprising a at least three differently colored inkjet inks comprising, individually, a colorant stably dispersed or dissolved in an aqueous vehicle, wherein at least one of the three differently colored inkjet inks further comprises a chelator, wherein the chelator comprises a non-polymeric molecule having at least two coordinating nitrogen atoms and no carboxyl groups.

16. The inkjet ink set of claim 15, wherein the chelator in the at least one of the three differently colored inkjet inks is present at a level effective to increase optical density over the same ink without chelator.

17. The inkjet ink set of claim 15, wherein the colorant in the at least one of the three differently colored inkjet inks is a self-dispersing pigment.

18. The inkjet ink set of claim 15, wherein the at least one of the three differently colored inkjet inks has a surface tension in the range of about 20 dyne/cm to about 70 dyne/cm at 25° C., and a viscosity as high as 30 cP at 25° C.

19. The inkjet ink set of claim 15, wherein the at least one of the three differently colored inkjet inks further comprises a multivalent cationic metal species.

20. The inkjet ink set of claim 15, wherein the chelator in the at least one of the three differently colored inkjet inks is selected from the group consisting of phenanthroline, 2,2-dipyridyl, 2,2-dipyridylamine and ethylene diamine, and derivatives thereof.

21. A method for ink jet printing onto a substrate, comprising the steps of:
   (a) providing an ink jet printer that is responsive to digital data signals;
   (b) loading the printer with a substrate to be printed;
   (c) loading the printer with an inkjet ink; and
   (d) printing onto the substrate using the inkjet ink in response to the digital data signals,
wherein the inkjet ink comprises an aqueous vehicle and a chelator, wherein the chelator comprises a non-polymeric molecule having at least two coordinating nitrogen atoms and no carboxyl groups and wherein either a) the ink is substantially colorless or b) the ink further comprises a self-dispersing pigment colorant.

22. The method of claim 21, wherein the printer is loaded with an inkjet ink set comprising a first inkjet ink and a second inkjet ink, wherein the first inkjet ink is a substantially colorless inkjet ink comprising an aqueous vehicle and a chelator, wherein the chelator comprises a non-polymeric molecule having at least two coordinating nitrogen atoms and no carboxyl groups, and the second inkjet ink is a colored ink comprising of an aqueous vehicle and pigment colorant.

23. The method of claim 22, wherein the second inkjet ink is underprinted with the first inkjet ink.

* * * * *